Patented Jan. 17, 1950

2,495,051

UNITED STATES PATENT OFFICE 2,495,051

PRODUCTION OF PHENANTHRIDINE DERIVATIVES

Harry James Barber, Gidea Park, England, assignor to May & Baker Limited, Essex, England No Drawing. Application November 21, 1947, Serial No. 787,487. In Great Britain November 21, 1946

4 Claims. (Cl. 260—286)

This invention is for improvements in or relating to the production of phenanthridine derivatives.

It is an object of the present invention to provide new phenanthridine derivatives constituting, for example, valuable intermediates for the production and isolation of certain therapeutically useful phenanthridinium salts. A further object of this invention is to provide an improvement in the production of certain phenanthridinium salts.

According to one feature of this invention, new phenanthridine derivatives are obtained by reacting with n-butyl or amyl alcohol the product obtainable by treating a quaternary salt of 2:7-diamino-9-phenylphenanthridine with an excess of alkali in a solvent medium.

The product obtainable by the treatment of the said phenanthridinium salt with an excess of alkali is a base, the structure of which is not known for certainty and the product may be either, or may contain both, the normal base of general Formula I

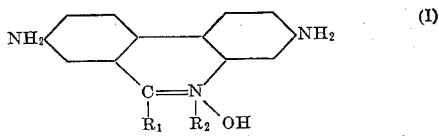

(where $R_1$ represents a phenyl group and $R_2$ represents an alkyl or aralkyl substituent) or the corresponding pseudo base of the general Formula II

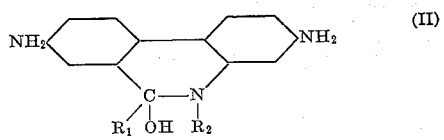

although I am at present inclined to the view that the product is the pseudo base (II).

The new phenanthridine derivatives of the present invention are believed to have the structure:

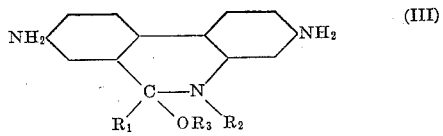

(where $R_1$ and $R_2$ have the significance hereinbefore defined and $R_3$ is a butyl or amyl group), These new compounds are well defined, crystalline derivatives which are especially useful as intermediates in the production of pure phenanthridinium salts of the type:

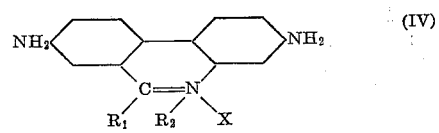

(where $R_1$ is a phenyl group, $R_2$ is an alkyl or aralkyl group and X is an anion such for example as $Cl^-$, $Br^-$ and $SO_4^-$).

The manufacturing processes normally employed for the production of quaternary salts of 2:7-diamino-9-phenyl-phenanthridine usually give rise to solutions containing the phenanthridinium cation together with an inorganic anion such as sulphate or chloride according to the nature of the previous stage. Thus if 2:7-dinitro-9-phenyl-10-methyl phenanthridinium chloride has been reduced to the corresponding 2:7-diamino compound, the product in solution will be the very soluble chloride. Methods hitherto employed for the isolation and partial purification have involved salting out, for example, the bisulphate or the bromide by introducing excess of the appropriate anion as an inorganic salt. Excess inorganic matter is easily removed by water crystallisation if a sparingly soluble phenanthridinium salt (for example, the bromide) is desired but, if a soluble salt, for example the chloride or neutral sulphate, is required the existing method has serious practical disadvantages. The alternative whereby the phenanthridinium hydroxide or corresponding pseudo base is precipitated by excess caustic alkali, also presents disadvantages, as these compounds usually form micro-crystalline or amorphous precipitates which are soluble in water but are salted out by excess alkali. The products of reaction between these phenanthridinium hydroxides or the corresponding pseudo bases with butyl or amyl alcohol are, however, crystalline derivatives which can readily be isolated and purified and by treatment with an acid or a salt of an acid with a weak base can readily be converted into the desired phenanthridinium salt.

In carrying the present invention into effect it is preferred to add the butyl or amyl alcohol to a solution containing the 2:7-diamino-9-phenyl-phenanthridinium salt before (instead of after) the addition of the alkali required to form the hydroxide or psuedo base, it having been found that a more readily filterable form of alkoxy derivative is thereby obtained. In general, an alkalinity corresponding to 1.5 normal is sufficient for complete conversion to alkoxy derivative. The reaction medium may comprise a diluent such as a methyl ethyl ketone; for example, the psuedo base can be dissolved in methyl ethyl ketone and the required alkoxy derivative obtained by adding either butyl or amyl alcohol to the solution.

As already stated, the alkoxy derivatives (III) are easily converted into phenanthridinium salts (I) by warming with the appropriate acid or salt of such acid with a weak, volatile base. This results in liberation of the alcohol which may be removed by any appropriate method such as steam distillation. This operation may be carried out at a suitable concentration for isolation of the salt from the resultant aqueous solution. Examples of suitable salts with weak, volatile bases are the ammonium salts, the slight acidity of which is sufficient to promote incipient decomposition of the butoxy or amyloxy derivative to phenanthridinium base with liberation of ammonia. If the solution is heated, this ammonia is expelled together with the butyl or amyl alcohol, and a solution of the phenanthridinium salt is obtained. The salt may then be isolated by methods appropriate to the particular salt in question.

The present invention is illustrated by the following examples:

*Example I*

40 gms. of 2:7-dinitro-9-phenyl-10-methyl phenanthridinium chloride are reduced in 360 ccs. of boiling water with 40 gms. of reduced iron B. P. The resulting solution containing the corresponding diamino compound is filtered from the iron and is treated at 90° C. with 80 ccs. of 44% w./v. caustic soda solution followed immediately by 100 ccs. of amyl alcohol, both operations being carried out with vigorous stirring. After cooling, the aqueous layer (almost colourless) is discarded and the amyl alcohol solution is filtered, the puce coloured residue washed with 20 ccs. of amyl alcohol and dried to yield 28 gms. of amyloxy derivative.

This is added to 200 ccs. of water containing 10 gms. of ammonium bromide and the amyl alcohol distilled out slowly together with some water. The solution is then allowed to cool and 2:7 - diamino - 9 - phenyl - 10 - methyl phenanthridinium bromide crystallises. Yield: 26 gms.

*Example II*

5 gms. of crude pseudo base, obtained by the method of Example I, are suspended in 25 ccs. of boiling ethyl acetate and 25 ccs. of hot butanol is added. After boiling for a few seconds the whole is rapidly filtered and allowed to crystallise. 2:7 - diamino - 9 - phenyl - 9 - butoxy - 10 - methyl - dihydrophenanthridine M. P. 215–220° C. with decomposition is obtained.

100 gms. of the product are suspended in 750 ccs. of water and 27 ccs. of 10 N hydrochloric acid added. The solution is distilled in order to remove butanol and to concentrate to a suitable volume. Some 450-500 ccs. of aqueous distillate are collected, the first fractions containing most of the butanol being kept for subsequent butanol recovery. The solution of 2:7 - diamino - 9 - phenyl - 10 - methyl - phenanthridinium chloride "Dimidium chloride" remaining is filtered and the acidity and volume adjusted to give 250 ccs. at a pH of 6–7.

The solution at about 18° C. is placed in a beaker with an anchor stirrer turning at about 50 R. P. M. and 1 litre of acetone is run in over about 5 minutes. The addition of acetone is then stopped and the solution is then seeded with a few crystals of dimidium chloride. After a few minutes the slow addition of acetone is resumed at such a rate that after about 15 minutes a further litre is added and thereafter a slower addition until after about 3 hours in all, a total of some 5 litres of acetone are added. After stirring for a further hour the whole is left overnight to complete crystallisation. The liquor is then decanted from the crystals which are then filtered by suction or centrifuged and washed first with 95% acetone and then pure acetone. The product is dried at 60° C.

The acetone solution is distilled to recover acetone and from the aqueous solution left the dimidium may be recovered as butoxide which can be returned to a fresh cycle of operations.

*Example III*

18.8 gm. of pure 2:7-dinitro-9-phenyl-10-methyl phenanthridinium methosulphate in 150 cc. of boiling water was added over 5 minutes to a boiling suspension of 18.8 gm. of reduced iron in 160 cc. of water contained in a 1 litre wide necked conical flask fitted with a high speed (2,000 R. P. M.) centrifugal stirrer. Reaction was instantaneous and fairly vigorous and when this was complete the resulting reaction mixture was boiled for a further 30 minutes (still with stirring) and then filtered hot from iron residues. The filtrate was basified with 15 cc. of .880 ammonia solution, heated to boiling, allowed to cool and filtered from a small amount (0.85 gm.) of insoluble material.

The volume of the cold filtrate was taken (to calculate the volumes of butanol and soda solution necessary) and then a volume of butanol (usually ca. 35 cc.) equal to 10% of the volume of the filtrate was added to the filtrate with stirring, followed by sufficient 50% w./v. NaOH solution (usually ca. 50 cc.) to make the aqueous layer 1.5 N with respect to NaOH. Stirring was continued for 5 minutes and the granular light magenta coloured butoxide was filtered off and sucked dry. After its redispersal in cold water it was filtered off again (on the same paper) washed well with water, then with 10 cc. of butanol (in 2 portions) followed finally by 25 cc. of ether (in 3 portions). The product was dried to constant weight on the 100° C. oven. Yield: 14.75 gm.=99.5%.

20 gm. of the butoxide, 5.42 cc. of 82.5% w./v. HBr solution (103% theory) and 125 cc. of water were placed into a 250 cc. round bottom flask fitted with stillhead and condenser, and 50 cc. of distillate were distilled out over 15 minutes. The resultant solution was treated with 5 gms. of charcoal, boiled for 5 minutes, filtered hot and allowed to crystallise. After filtration, the crystals were washed with 5 cc. of ice cold water, sucked dry and then dried in the 100° C. oven. Yield: 19.76 gm.= 94.8%.

*Example IV*

A solution containing approximately 1100 gm. of 2:7-dinitro-9-phenyl-10-methyl phenanthridinium salts (calculated as methosulphate) together with various by-products arising from the manufacturing process, in a volume of about 20 litres, was run as rapidly as possible (7 minutes) into a vigorously boiling (internal temperature about 98° C.) suspension of 1,413 gm. of reduced iron in 9 litres of water, the vigorous frothing which ensued being controlled by means of a fine spray of cold water. The reaction mixture is then stirred at the boiling point for 45 minutes. The suspended iron is separated from the deep red liquor by filtering hot and washing with 2 litres of boiling water. The filtrate is then diluted to 29 litres to make up for evaporation losses during reduction.

The filtrate is returned to the cast iron enamel pan, heated to boiling and treated with liquid ammonia (s. g. 0.880; 1.2 litres). After being allowed to settle out (overnight) the cold deep red suspension is filtered, the somewhat glutinous brown residue being washed with cold water (1 litre). The filtrate (31 litres) is returned to the cleaned cast iron enamel pan. n-Butanol (2.8 litres) is added with stirring, followed by sufficient concentrated sodium hydroxide solution to make the reaction mixture 1.5 N (30% w./v. solution; 6.7 litres). After 5 minutes stirring at room temperature the suspended butoxide is collected by filtration on thick filter twill and washed once with water (1 litre). The butoxide is redispersed in water (10 litres). The suspension is vigorously stirred for 5 minutes and filtered again on the same cloth. The product is washed successively with water (2 litres), butanol (750 cc.) and ether (2.5 litres), and dried in a 100° C. oven to constant weight. The butanol wash is collected separately for butanol recovery. Yield: 750 gm.=67% 2:7-diamino-9-butoxy-9-phenyl-10-methyl-9 - 10 - dihydrophenanthridine (butoxide).

The specific gravity of the nominal 50% w./v. hydrobromic acid is determined and the volume required to give 1.03 molar proportions of hydrogen bromide relative to the butoxide used (750 gm.) is calculated. This volume of acid together with the butoxide and water (4.6 litres) are charged into a 10 litre flask. 1.8 litres of butanol/water mixture is then distilled out of the deep red reaction liquor. The remaining dimidium bromide solution is treated with charcoal (15 gm.), refluxed for 5 minutes, filtered hot, diluted to 4 litres, and allowed to cool to 20° C. overnight. Crystals of dimidium bromide commence to separate at about 65° C. The red crystalline product is collected on a 9″ Buchner funnel, washed with 500 cc. of ice cold water in four portions, sucked down and dried in a 100° C. oven to constant weight. Yield: 703 gm.=88% 2:7-diamino - 9 - phenylphenanthridine - 10-methobromide monohydrate (dimidium bromide).

I claim:

1. A process for the production of intermediates in the manufacture and isolation of 2:7-diamino - 9 - phenyl - 10 - alkyl-phenanthridinium salts which comprises reacting a member of the class consisting of n-butyl and amyl alcohols with the product of treating a quaternary salt of 2:7-diamino-9-phenylphenanthridine with an excess of alkali in a solvent medium.

2. A step in the manufacture of pure 2:7-diamino-9-phenyl-10-alkyl-phenanthridinium salts which comprises treating a solution containing one of such salts and a member of the class consisting of n-butyl and amyl alcohols with excess of alkali in a solvent medium to produce a compound of the following general formula:

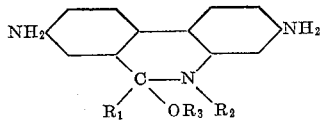

(where $R_1$ represents a phenyl radical, $R_2$ represents a member of the class consisting of alkyl and aralkyl substituents, and $R_3$ is a member of the class consisting of butyl and amyl groups), isolating that compound and converting it into the required phenanthridinium salt by warming with a member of the class consisting of the corresponding acid and salts of such acid with a weak base.

3. A process for obtaining a pure 2:7-diamino-9-phenyl-10-alkyl phenanthridinium salt from the solution resulting from the reduction in the solution of a 2:7-dinitro-9-phenyl-10-alkyl phenanthridinium salt, which comprises treating that solution with excess alkali and with a member of the class consisting of butyl and amyl alcohols, these steps being carried out in either order, the alkalinity of the solution after addition of said alcohol corresponding to 1.5 normal, removing from the solution the crystalline alkoxy derivative thus formed and converting that alkoxy derivative into a quaternary salt of the 2:7-diamino-9-phenyl phenanthridine by warming with a member selected from the class consisting of the corresponding acid and salts of such acid with a weak, volatile base.

4. Alkoxy derivatives of the general formula:

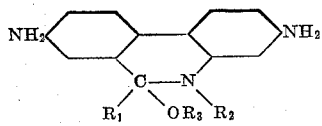

(where $R_1$ represents a phenyl radical, $R_2$ represents a member of the class consisting of a hydrogen atom and alkyl and aralkyl radicals and $R_3$ is a member of the class consisting of butyl and amyl groups.

HARRY JAMES BARBER.

REFERENCES CITED

The following references are of record in the file of this patent:

UNITED STATES PATENTS

| Number | Name | Date |
|---|---|---|
| 2,437,869 | Walls | Mar. 16, 1948 |

FOREIGN PATENTS

| Number | Country | Date |
|---|---|---|
| 511,353 | Great Britain | Aug. 17, 1939 |

Certificate of Correction

Patent No. 2,495,051 January 17, 1950

HARRY JAMES BARBER

It is hereby certified that error appears in the printed specification of the above numbered patent requiring correction as follows:

Column 5, line 5, for the word "about" read *above*;

and that the said Letters Patent should be read with this correction therein that the same may conform to the record of the case in the Patent Office.

Signed and sealed this 6th day of June, A. D. 1950.

[SEAL]

THOMAS F. MURPHY,
*Assistant Commissioner of Patents.*